June 30, 1936.   N. M. ROSENDAHL   2,046,092
OILING SYSTEM
Filed June 23, 1933
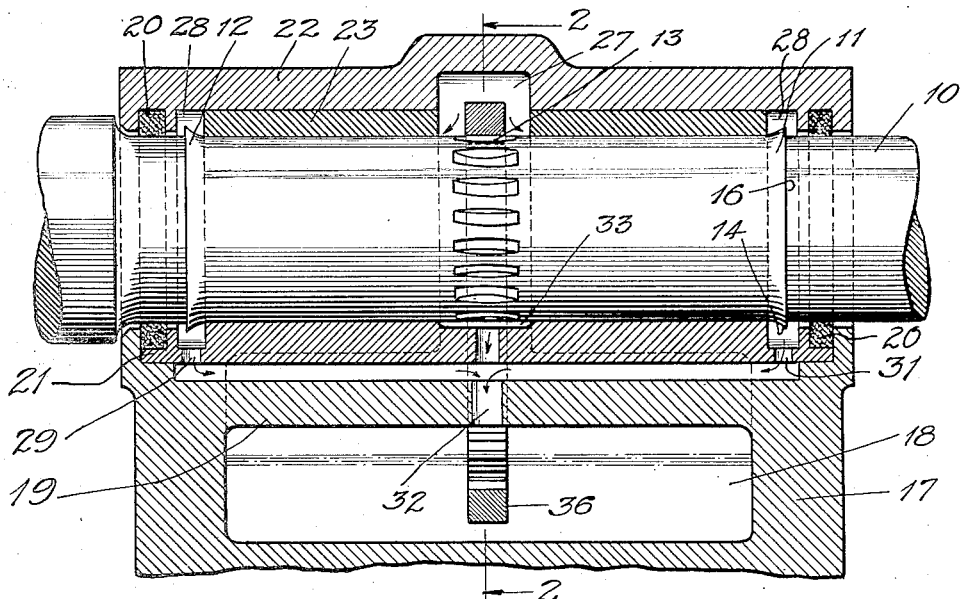
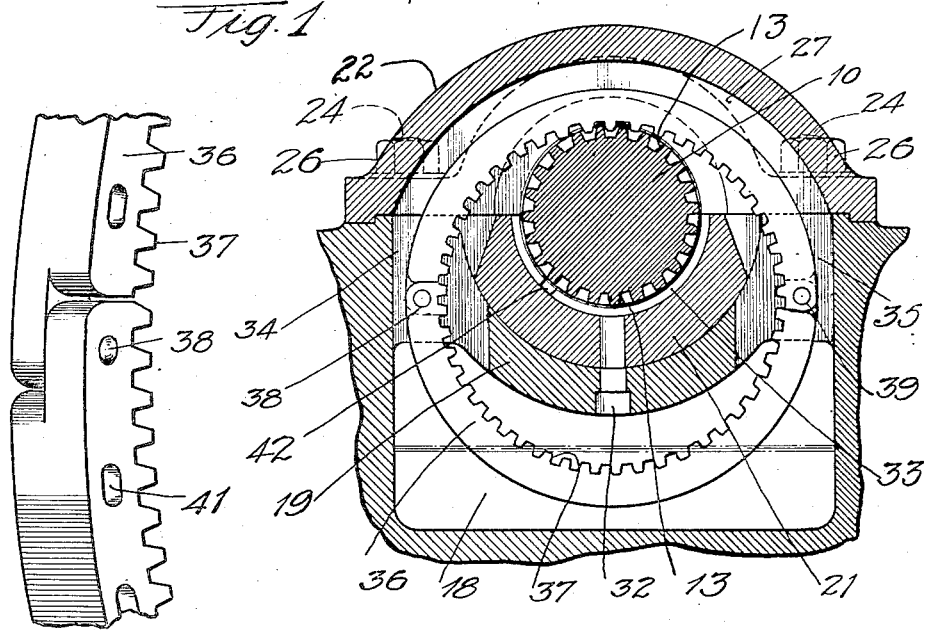
INVENTOR
NILS M. ROSENDAHL
BY Flournoy Corey
ATTORNEY Patented June 30, 1936

2,046,092

UNITED STATES PATENT OFFICE 2,046,092

OILING SYSTEM

Nils M. Rosendahl, Cedar Rapids, Iowa, assignor to Universal Crusher Company, Cedar Rapids, Iowa, a corporation of Delaware Application June 23, 1933, Serial No. 677,251

1 Claim. (Cl. 308—128)

My invention relates to oiling systems for supplying oil to relatively large rotating shafts and has particularly relation to an oiling system including a ring for dipping oil from a sump and conveying it to the shaft.

It is common practice in supplying oil to a large shaft, to provide an oil supply or "sump" in the base of the shaft bearing and to carry the oil up on to the shaft by means of a ring which encircles and rests upon the shaft, and which is of sufficient diameter so as to depend below the shaft with the bottom dipping into the oil of the sump.

It is the usual practice in oiling systems of this character to provide packing rings of felt or the like on either side of the shaft bearing to prevent oil from being carried outside of the bearing.

Such oiling systems were satisfactory, so long as the oil remained or was kept within a certain rather narrow range of temperature, and so long as the packing means was fresh and new. It is apparent, however, that it was necessary, with oiling systems of this character, to choose an oil which would be of a certain desired viscosity at the natural running temperature of the shaft and bearing.

It is apparent, however, that when the shaft was being started up, at which time proper lubrication was most necessary, that the oil would be cold and thick, and that as a result, the ring would slip on the shaft and would not supply oil, thus sometimes burning out the bearings through lack of oil, and at all times making the starting load, because of friction, much greater than the running load.

Furthermore, if the bearing became hot the ring might also slip on the shaft and would not supply sufficient oil for lubrication; thus resulting in higher temperatures of the bearing and even more slipping of the ring. This effect was cumulative and sometimes the bearing was burned out. Heating of the shaft caused the packing material at the ends of the bearing to become hard and charred and oil leaked past the packing.

Another disadvantage of the prior construction was that the bearing did not extend the full length of the portion of the shaft inside of the bearing caps, and thus the shaft was not supported at all points and pounding of the bearing metal occurred.

My new and improved oiling system and bearing structure avoids the difficulties above mentioned, and it is a general object of my invention to provide a new and improved oiling system and shaft-bearing structure.

A more specific object of my invention is to provide a ring oiler which will be positively actuated regardless of the viscosity, bearing temperature, starting load, and other factors.

Another object of my invention is to provide an oiling system in which the oil is prevented from passing out through the ends of the bearing.

Another object of my invention is to provide an oiling system in which the oil is conducted to the shaft, made to flow out along that portion of the shaft which is located within the bearing, is then removed from the shaft and conducted back into the sump.

Another object of my invention is to provide an improved structure for supporting the shaft within the bearing.

Another object of my invention is to provide additional means for carrying oil from the sump to the shaft, which means will be positive in operation.

Another object of my invention is to provide an improved bridge structure for supporting the bearing.

Another object of my invention is to provide an improved ring for ring oiling systems.

Other and further objects and features of my invention will be more apparent to those skilled in the art upon a consideration of the accompanying drawing and following specifications, wherein is disclosed an exemplary embodiment of the invention, with the understanding, however, that such changes may be made therein as fall within the scope of the appended claim without departing from the spirit of the invention.

In said drawing,

Figure 1 is a view, partly in section and partly in side elevation, of a bearing, a shaft, a ring oiling device, and a system constructed according to one embodiment of my invention.

Figure 2 is a view in section of the device shown in Figure 1 and taken along the line 2—2 thereof, and Figure 3 is a view in perspective of a portion of a ring constructed according to one embodiment of my invention.

Referring now to the drawing, there is shown at 10, generally, one end of a shaft such as is used in relatively heavy machinery such as large electric motors, rock-crushing machinery and the like. This shaft has been modified from the usual construction by providing flingers 11 and 12 near the outer ends of the portion of the shaft which is located within the bearing, and by cutting teeth as indicated at 13 at the middle of the portion of the shaft which is located at the center of the bearing.

The flingers 11 and 12 are in the form of flanges which encircle the shaft, having the sides toward the center of the bearing sloping outwardly as indicated at 14, and having the outer faces radial, as shown at 16, so that oil coming from the center of the bearing passes outwardly up the sloping faces of the flingers and is shown off by centrifugal force when it reaches the tip of the flingers.

The teeth 13 may be formed in any suitable manner but are preferably formed by cutting a series of depressions around the shaft by means of a milling cutter so that the bottoms of the depressions slope outwardly from the center of the bearing. If cut by a milling cutter the bottoms of the depressions would be arcuate in shape and the sides straight, sloping, or arcuate. By cutting the teeth of the shaft in this manner, several purposes are served. In the first place, it is a less expensive operation to cut teeth with a circular milling tool than to cut them with a shaper or the like; secondly, the sloping walls assist centrifugal action of the shaft on the particles of oil in throwing the oil outwardly from the center of the bearing so that it reaches the bearing surfaces, and thirdly, the sloping walls of the cut cause the ring to be guided toward and kept at the center line of the teeth.

The bearing pedestal 17, in outward appearance, is of the usual form, but is hollowed out as indicated in 18 to provide a large well or sump in which a supply of oil may be stored. A heavy, bridge-like portion 19 of the pedestal structure extends over the sump 18 and affords a support for the lower half 21 of the bearing sleeve proper. The cap 22 is of substantially the usual construction and carries with it the upper half 23 of the bearing sleeve. The cap is secured to the pedestal base 17 by means of bolts 24 and nuts 26. A semi-circular opening 27 is provided on the inner wall of the cap 22 at the central portion thereof to permit the ring hereinafter described to pass around the shaft, and the upper portion of the upper bearing 23 is cut away so that the ring may rest on the shaft.

Semi-circular grooves 28 are provided in each end of both the cap 22 and the base 17, to provide chambers for collecting the oil flung off the shaft by the flingers 11 and 12, and conduits or bores 29 and 31 are provided in the base just below the chambers 28 and extending to the central portion of the bridge member 19 where they connect with another bore 32, which extends downwardly from a small circular recess 33 in the lower bearing half 21, through the bridge member 19, and into the sump 18. The ends of the bearing are closed by means of washers 20, of felt or the like.

Referring now more particularly to Figure 2, it will be seen that the chamber 27 is continuous with passageways 34 and 35 in the base 17. In this way, a passageway is provided entirely around the shaft 10 and around the lower bearing half 21, and around the bridge member 19 so that a ring 36 may be located in this passageway and rest on the shaft with the lower portion of the ring in the sump 18.

The ring 36 is preferably substantially square in cross section and is provided with teeth 37 in its inner wall which are of the same pitch as the teeth 13 of the shaft 10. The ring 36 is preferably of two semi-circular parts and the parts are hinged together as indicated in 38 and 39 in order that when the bearing is being assembled, the shaft 10 may be placed in the bearing, the ring 36 placed on the shaft and fastened about it, and the cap 22 bolted on top of the base to form an oil tight bearing.

If desired, openings 41 may be provided leading transversely through the ring 36 in order to lighten the ring and to provide additional means for carrying oil from the sump to the shaft.

The toothed engagement of the ring 36 with the shaft 10 serves two purposes. First, it provides a positive drive for the ring which will carry oil from the sump to the shaft regardless of the viscosity of the oil, and secondly, the teeth on the ring serve as pockets to carry oil from the sump to the shaft.

In operation, when the machine is started up, the ring 26 begins to rotate as soon as the shaft 10 starts to rotate. The ring carries oil on its surface, in the teeth 37, and in the openings 41, which oil is discharged onto the shaft by the squeezing action of the teeth 13 on shaft 10 and teeth 37 on the ring, and by gravity. The oil is conducted away from the shaft at the teeth by means of a small wiper groove 42 which extends the length of the bearing half 21 and communicates with the circular channel 33. The oil is flung outwardly by centrifugal action of the shaft to either side of the groove made by the teeth 13, so that the oil passes between the shaft and the bearing halves 21 and 23. The oil gradually flows outwardly along the shaft until it reaches the flingers 11 or 12 where it is flung from the shaft by centrifugal action and is gathered by the circular channels 28. The oil then flows through the conduits 29 and 31, into the conduit 32, and back into the sump. Any excess oil which is deposited on the shaft 10 at the central portion may flow into the semi-circular channel 33 and pass directly downwardly through the conduit 32 and into the sump.

It is apparent that I have provided an extremely efficient oiling system which is positively actuated regardless of the viscosity or temperature of the oil and which insures a sufficient supply of oil at all times. An oiling system constructed according to my invention will cause oil to flow to all parts of the bearing, yet no oil leaks out from the ends of the bearing. The lower bearing half, which supports the load of the machine, is supported throughout its length so that hammering of the bearing metal does not take place. A device constructed according to my invention is simple and inexpensive.

It is apparent that modifications of my device may be made by those skilled in the art. Such modifications may be made without departing from the spirit and scope of my invention as set forth in the appended claim.

I claim as my invention:

An oiling system including a shaft, a bearing housing having an oil sump therein, a bearing having a recess in its upper portion and means for carrying the oil from the sump to the shaft comprising a ring encircling the shaft having geared teeth on the inner face thereof, and a substantially horizontal portion of the shaft having a series of depressions encircling the shaft of substantially less width than said recess the bottom surfaces of which depressions are arcuate, the teeth on the ring and the depressions of the shaft being disposed to have geared connection to insure positive rotation of the ring with the shaft and whereby the arcuate bottom surfaces cause graduated increasing lateral pressure to be applied to the ring to urge it to the central position to provide a substantial clearance between it and the walls of the recess the further it moves from the central position.

NILS M. ROSENDAHL.